United States Patent
Oshima

(10) Patent No.: US 10,770,030 B2
(45) Date of Patent: Sep. 8, 2020

(54) PROJECTION DISPLAY DEVICE, PROJECTION CONTROL METHOD, AND PROJECTION CONTROL PROGRAM

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 16 days.

(21) Appl. No.: 16/116,870

(22) Filed: Aug. 29, 2018

(65) Prior Publication Data

US 2019/0012983 A1 Jan. 10, 2019

Related U.S. Application Data

(63) Continuation of application No. PCT/JP2017/002124, filed on Jan. 23, 2017.

(30) Foreign Application Priority Data

Mar. 1, 2016 (JP) ................... 2016-039036

(51) Int. Cl.
*G09G 5/10* (2006.01)
*G02B 27/01* (2006.01)
(Continued)

(52) U.S. Cl.
CPC ............... *G09G 5/10* (2013.01); *B60K 35/00* (2013.01); *G02B 27/01* (2013.01);
(Continued)

(58) Field of Classification Search
CPC ............ G09G 5/10; G09G 3/02; G09G 3/002; G09G 2380/10; G09G 2360/16;
(Continued)

(56) References Cited

U.S. PATENT DOCUMENTS 9,304,318 B2 4/2016 Sugiyama et al.
2010/0264850 A1* 10/2010 Yamamoto ............... G09G 5/14
315/312
(Continued)

FOREIGN PATENT DOCUMENTS

JP H02-246839 10/1990
JP H05-278498 10/1993
(Continued)

OTHER PUBLICATIONS

Yanagisawa et al, "translation of WO2014155590A1—Virtual image generation device and head-up display" (Year: 2014).*
(Continued)

*Primary Examiner* — Tapas Mazumder
(74) *Attorney, Agent, or Firm* — JCIPRNET

(57) ABSTRACT

A projection display device has a projection display unit that performs, in accordance with input image data, spatial modulation on light emitted by a light source, and projects image light obtained through the spatial modulation onto a projection surface of a vehicle to display an image that is based on the image data, the projection surface is formed of a member having a reflectance that is higher for light in a plurality of wavelength ranges than for light in a wavelength range outside the plurality of wavelength ranges, and the projection display device includes: a projection angle control mechanism that controls a projection angle of the image light on the projection surface; and an image light control unit that controls, in accordance with the projection angle, intensity of the light in the plurality of wavelength ranges included in the image light.

24 Claims, 8 Drawing Sheets

(51) Int. Cl.
  *B60K 35/00* (2006.01)
  *H04N 9/31* (2006.01)
  *G09G 3/00* (2006.01)
  *G09G 3/02* (2006.01)

(52) U.S. Cl.
  CPC ......... *G02B 27/0101* (2013.01); *G09G 3/002* (2013.01); *G09G 3/02* (2013.01); *H04N 9/3141* (2013.01); *B60K 2370/1529* (2019.05); *B60K 2370/334* (2019.05); *B60K 2370/66* (2019.05); *B60K 2370/67* (2019.05); *B60K 2370/736* (2019.05); *G02B 2027/0118* (2013.01); *G09G 2320/0666* (2013.01); *G09G 2360/145* (2013.01); *G09G 2360/16* (2013.01); *G09G 2380/10* (2013.01)

(58) Field of Classification Search
  CPC ..... G09G 2360/145; G09G 2320/0666; H04N 9/3141; G02B 27/01; G02B 27/0101; G02B 2027/0118; B60K 35/00; B60K 2370/736; B60K 2370/66; B60K 2370/1529; B60K 2370/67; B60K 2370/334
  See application file for complete search history.

(56) References Cited

U.S. PATENT DOCUMENTS

2014/0176425 A1* 6/2014 Bae ................ G06F 3/0485
                                                     345/156
2016/0209651 A1   7/2016 Ichihashi et al.
2017/0068091 A1*  3/2017 Greenberg .......... G06F 3/013

FOREIGN PATENT DOCUMENTS

| | | |
|---|---|---|
| JP | H07-290994 | 11/1995 |
| JP | H10-278630 | 10/1998 |
| JP | 2009-132221 | 6/2009 |
| JP | 2012-058272 | 3/2012 |
| JP | 2012-078619 | 4/2012 |
| JP | 2015-040865 | 3/2015 |
| JP | 2015-203765 | 11/2015 |
| WO | 2009020013 | 2/2009 |
| WO | 2013035813 | 3/2013 |
| WO | 2014155590 | 10/2014 |
| WO | 2015050202 | 4/2015 |
| WO | 2015132775 | 9/2015 |
| WO | 2015177833 | 11/2015 |

OTHER PUBLICATIONS

"International Search Report (Form PCT/ISA/210) of PCT/JP2017/002124", dated Mar. 21, 2017, with English translation thereof, pp. 1-5.

"Written Opinion (Form PCT/ISA/237)", dated Mar. 21, 2017, with English translation thereof, pp. 1-9.

"Office Action of Japan Counterpart Application" dated Sep. 4, 2018, with English translation thereof, p. 1-p. 5.

"Office Action of China Counterpart Application", dated Jun. 11, 2020, with English translation, p. 1-p. 11.

* cited by examiner

PROJECTION DISPLAY DEVICE, PROJECTION CONTROL METHOD, AND PROJECTION CONTROL PROGRAM

CROSS REFERENCE TO RELATED APPLICATION

This is a continuation of International Application No. PCT/JP2017/002124 filed on Jan. 23, 2017, and claims priority from Japanese Patent Application No. 2016-039036 filed on Mar. 1, 2016, the entire disclosures of which are incorporated herein by reference.

BACKGROUND OF THE INVENTION

1. Field of the Invention

The present invention relates to a projection display device, a projection control method, and a computer readable medium storing a projection control program.

2. Description of the Related Art

A head-up display (HUD) for a vehicle has been known. In the HUD, a combiner disposed on a windshield or near a position before the windshield of a vehicle, such as an automobile, a train, a ship, a heavy machine, a construction machine, an aircraft, or an agricultural machine, is used as a screen and light is projected onto the screen to display an image (see, for example, JP1998-278630A (JP-H10-278630A) and JP2009-132221A). The HUD enables a driver to visually recognize an image that is based on light projected from the HUD as a real image on the screen or as a virtual image in front of the screen.

The HUD described in JP1998-278630A (JP-H10-278630A) projects light onto a combiner that uses a hologram element having a high reflectance for light in a specific wavelength range and enables visual recognition of a virtual image by using light diffracted by the hologram. In this HUD, a diffraction characteristic of the hologram element is designed so that the brightness of a virtual image that is visually recognized is constant even if the incidence angle of light projected onto the combiner is changed.

The HUD described in JP2009-132221A projects light onto a windshield of an automobile and enables visual recognition of a virtual image by using light reflected by the windshield. In this HUD, the projection position of light on the windshield can be changed. With the brightness of projected light being adjusted in accordance with a change in the projection position, a change in the brightness of a virtual image caused by the change in the projection position is prevented, and favorable visibility is realized.

SUMMARY OF THE INVENTION

As in the HUD described in JP1998-278630A (JP-H10-278630A), in a configuration in which light is projected onto a projection surface that uses a hologram element having a high reflectance for light in a specific wavelength range, the reflectance for light in the specific wavelength range is changed by the incidence angle of light projected onto the projection surface. Here, if the hologram element has a high reflectance for wavelength ranges corresponding to a plurality of colors, the degree of change in the reflectance varies according to a color.

In the HUD described in JP1998-278630A (JP-H10-278630A), the diffraction characteristic of the hologram element is designed so that the brightness of light of a plurality of colors is always constant. In this case, however, the design of the combiner is complex and the manufacturing cost increases. In addition, there is a limit on control of the diffraction characteristic of the hologram element. If it is impossible to control the diffraction characteristic, measures need to be taken accordingly, for example, the rotation angle of the combiner is limited.

The HUD described in JP2009-132221A is directed to solving an issue that arises in the case of projecting light onto a windshield that does not use the above-described hologram element and does not address an issue regarding improvement of visibility in the case of using the hologram element.

The present invention has been made in view of the above-described circumstances and an object of the present invention is to provide a projection display device, a projection control method, and a projection control program that are able to make the visibility of an image favorable regardless of the incidence angle of light on a projection surface.

A projection display device according to the present invention is a projection display device having a projection display unit that performs, in accordance with input image data, spatial modulation on light emitted by a light source, and projects image light obtained through the spatial modulation onto a projection surface of a vehicle to display an image that is based on the image data, the projection surface being formed of a member having a reflectance that is higher for light in a plurality of wavelength ranges than for light in a wavelength range outside the plurality of wavelength ranges. The projection display device includes a projection angle control mechanism that controls a projection angle of the image light on the projection surface; and an image light control unit that controls, in accordance with the projection angle, intensity of the light in the plurality of wavelength ranges included in the image light.

A projection control method according to the present invention is a projection control method for performing, in accordance with input image data, spatial modulation on light emitted by a light source, and projecting image light obtained through the spatial modulation onto a projection surface of a vehicle to display an image that is based on the image data, the projection surface being formed of a member having a reflectance that is higher for light in a plurality of wavelength ranges than for light in a wavelength range outside the plurality of wavelength ranges. The projection control method includes a projection angle control step of controlling a projection angle of the image light on the projection surface; and an image light control step of controlling, in accordance with the projection angle, intensity of the light in the plurality of wavelength ranges included in the image light.

A projection control program according to the present invention is a projection control program for performing, in accordance with input image data, spatial modulation on light emitted by a light source, and projecting image light obtained through the spatial modulation onto a projection surface of a vehicle to display an image that is based on the image data, the projection surface being formed of a member having a reflectance that is higher for light in a plurality of wavelength ranges than for light in a wavelength range outside the plurality of wavelength ranges. The projection control program causes a computer to execute a projection angle control step of controlling a projection angle of the image light on the projection surface; and an image light control step of controlling, in accordance with the projection angle, intensity of the light in the plurality of wavelength ranges included in the image light.

According to the present invention, a projection display device, a projection control method, and a projection control program that are able to make the visibility of an image favorable regardless of the incidence angle of light on a projection surface can be provided.

Figure 1:
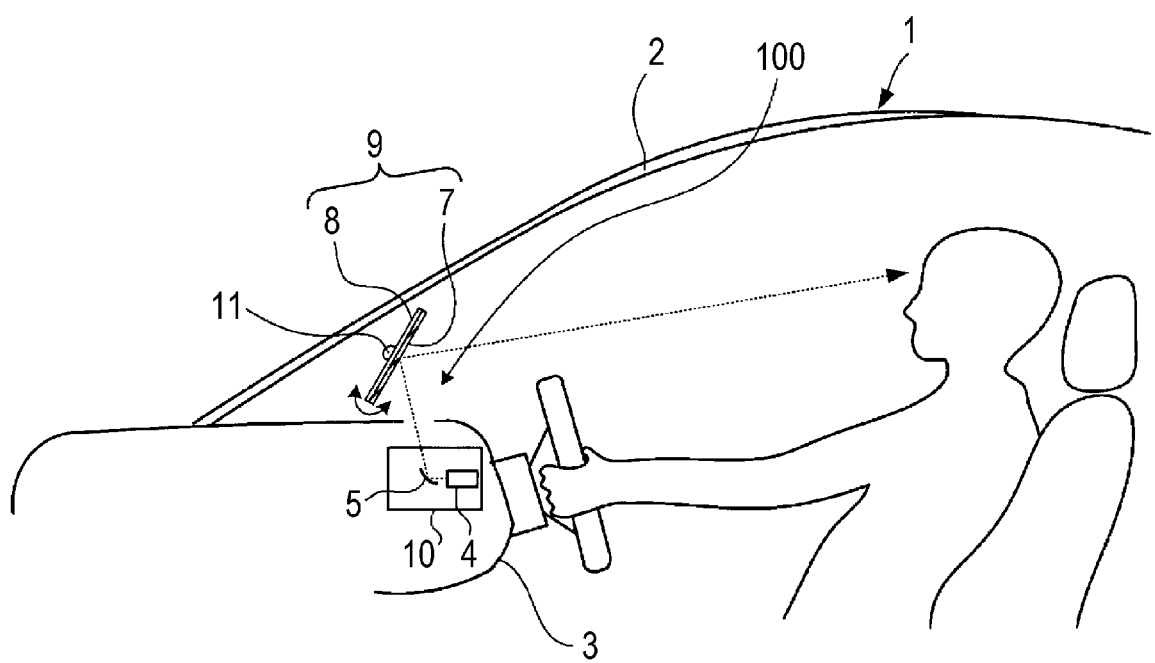
FIG. 1 is a diagram illustrating the schematic configuration of a projection display system 100 including a head-up display (HUD) 10 serving as a projection display device according to an embodiment of the present invention.

REFERENCE SIGNS LIST 100, 100A, 100B projection display system
10, 10A, 10B HUD
1 automobile
2 front windshield
3 dashboard
4 image light generation unit
5 concave mirror
6, 6A, 6B system control unit
7 wavelength selection film
8 transparent plate
9 combiner
11, 13 rotation mechanism
12 light detection unit
40 light source unit
40A light source control unit
41r R light source
41g G light source
41b B light source
42r, 42g, 42b collimator lens
43 dichroic prism
44 light modulation element
45 driving unit
46 diffusion member

DESCRIPTION OF THE PREFERRED EMBODIMENTS

Hereinafter, an embodiment of the present invention will be described with reference to the drawings.

Figure 2:
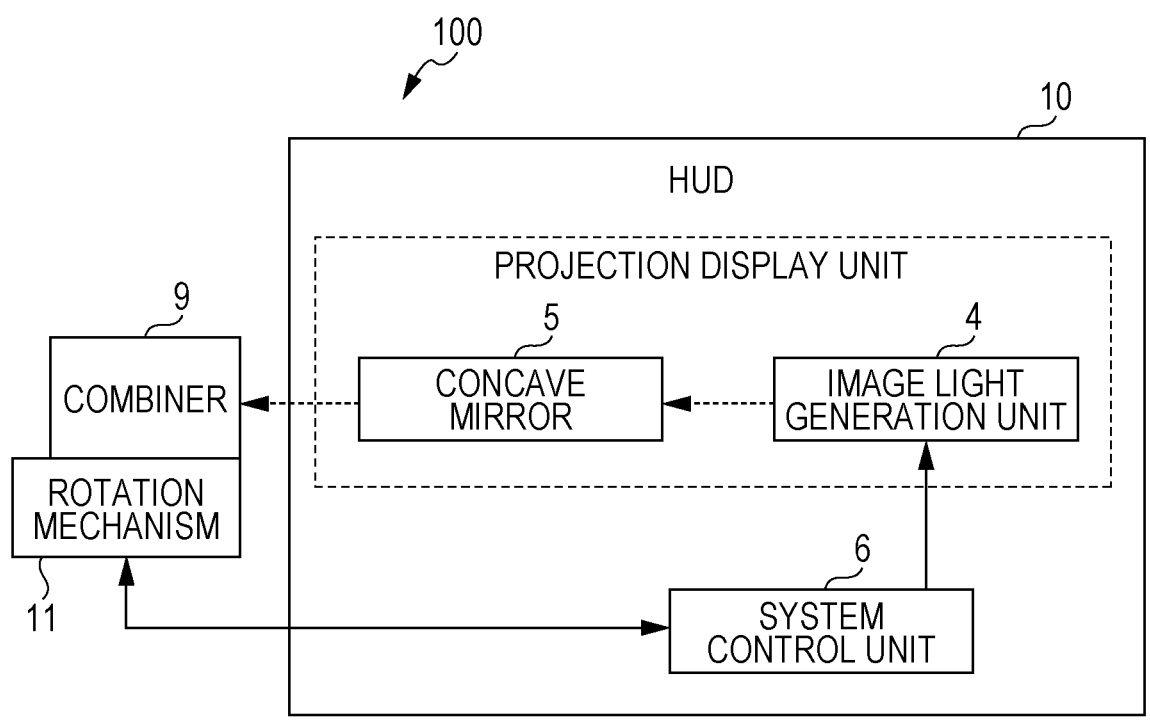
FIG. 2 is a schematic diagram illustrating the configuration of the projection display system 100 illustrated in FIG. 1.

FIG. 1 is a diagram illustrating the schematic configuration of a projection display system 100 including a head-up display (HUD) 10 serving as a projection display device according to an embodiment of the present invention. FIG. 2 is a schematic diagram illustrating the configuration of the projection display system 100 illustrated in FIG. 1.

The projection display system 100 is mounted in an automobile 1 and includes a combiner 9 disposed before a front windshield 2 on the driver side, the HUD 10, and a rotation mechanism 11 for rotating the combiner 9.

The projection display system 100 illustrated in FIG. 1 may be used by being mounted in a vehicle, such as a train, a heavy machine, a construction machine, an aircraft, a ship, or an agricultural machine, as well as an automobile.

The HUD 10 uses the combiner 9 as a projection surface and enables a driver of the automobile 1 to visually recognize a virtual image or real image by using image light projected onto the combiner 9.

In the example illustrated in FIG. 1, the HUD 10 is built in a dashboard 3 of the automobile 1. The dashboard 3 is a member that contains, in its inside, built-in components including gauges for presenting information necessary for driving, such as a speedometer, a tachometer, a fuel gauge, a water temperature gauge, an odometer, or the like of the automobile 1.

The HUD 10 may be installed near the ceiling above the driver's seat of the automobile 1. In this case, the combiner 9 and the rotation mechanism 11 are installed near the ceiling above the driver's seat.

The combiner 9 includes a transparent plate 8 and a wavelength selection film 7 formed on a surface of the transparent plate 8.

The transparent plate 8 is a plate-like member that allows visible light to pass therethrough.

The wavelength selection film 7 is a member that allows visible light to pass therethrough and has a reflectance that is higher for light in a plurality of wavelength ranges than for light in a wavelength range outside the plurality of wavelength ranges. In FIG. 1, the positions of the wavelength selection film 7 and the transparent plate 8 may be inverted.

Hereinafter, a description will be given under the assumption that the wavelength selection film 7 has a reflectance that is higher for light in a wavelength range of red (R), light in a wavelength range of green (G), and light in a wavelength range of blue (B) than for light in a wavelength range outside these wavelength ranges.

As described in WO2015/50202A, a member that has a visible light transmitting property and has a center wavelength of a reflection wavelength range in each of the plurality of wavelength ranges may be used as the wavelength selection film 7.

The rotation mechanism 11 is a projection angle control mechanism for controlling the projection angle (incidence angle) of image light projected onto the combiner 9 from the HUD 10.

Specifically, the rotation mechanism 11 is a mechanism for rotating the combiner 9 around an axis that extends in a direction of connecting the driver's seat and the passenger seat of the automobile 1. When the combiner 9 rotates around the axis, the projection angle of image light on a surface on which the image light is projected (projection surface) of the combiner 9 is changed.

The rotation mechanism 11 includes an actuator (not illustrated), such as a stepper motor, and controls the rotation angle of the combiner 9 by using a system control unit 6, which will be described below.

The HUD 10 includes an image light generation unit 4, a concave mirror 5, and the system control unit 6. The image light generation unit 4 includes a light source and a light modulation element that performs, in accordance with image data, spatial modulation on light emitted by the light source. The concave mirror 5 serves as an enlarging and projecting member that enlarges image light obtained through the spatial modulation performed by the light modulation element of the image light generation unit 4 and that projects the image light onto the combiner 9. The system control unit 6 integrally controls the entire HUD 10.

The image light generation unit 4 and the concave mirror 5 constitute a projection display unit that projects, onto the combiner 9 of the automobile 1, image light obtained through spatial modulation performed in accordance with image data and that displays an image that is based on the image data.

The system control unit 6 is mainly constituted by a processor and includes a read only memory (ROM) storing a program or the like to be executed by the processor, a random access memory (RAM) serving as a work memory, and so forth. The ROM constitutes a storage medium. The program includes a projection control program.

The system control unit 6 detects the projection angle of image light projected from the HUD 10 onto the combiner 9, in accordance with information about the rotation position of the combiner 9 rotated by the rotation mechanism 11 and table data that represents a relationship between the rotation position of the combiner 9 and the projection angle of image light projected from the HUD 10 and that is stored in the HUD 10 in advance.

Figure 3:
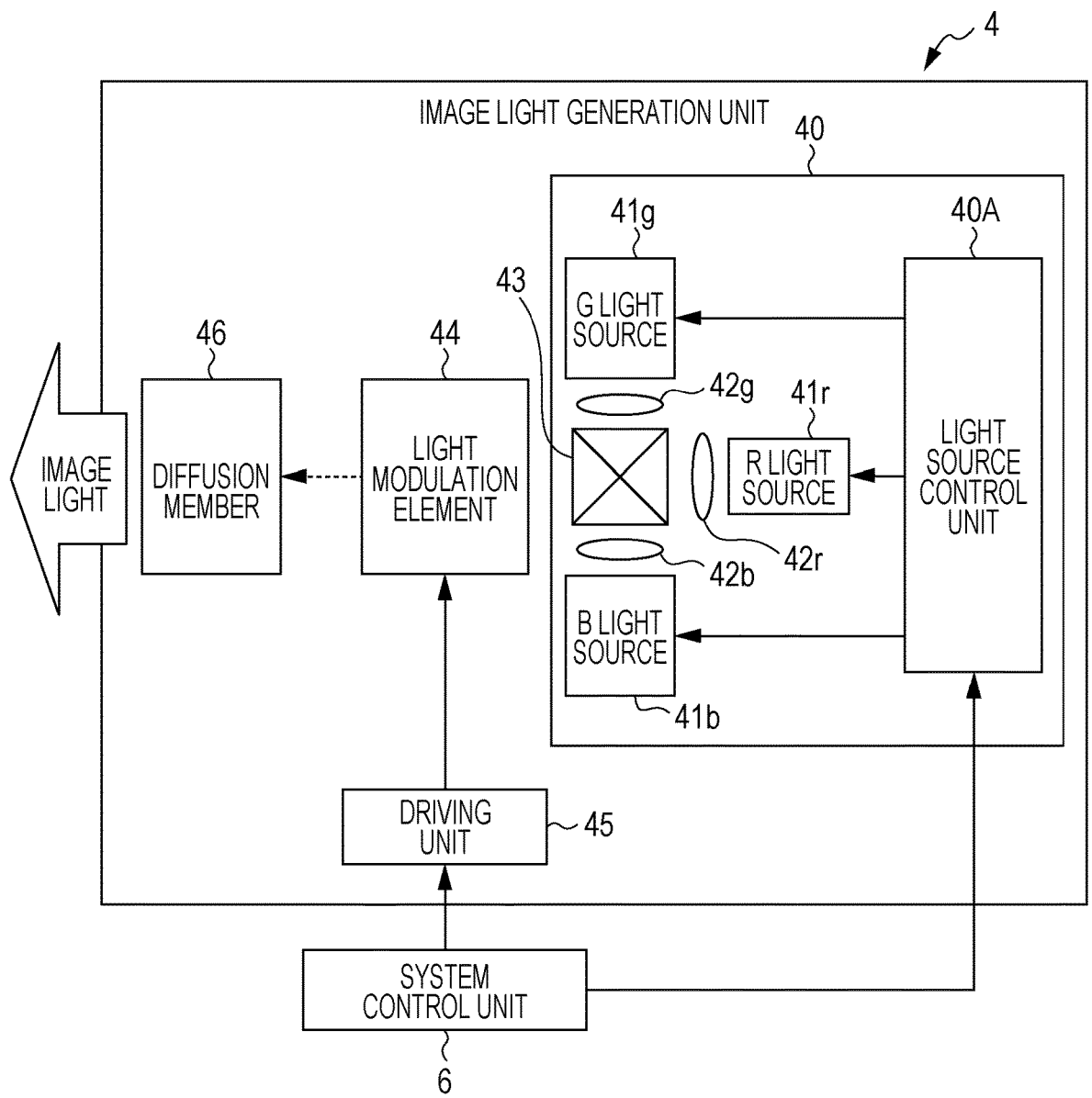
FIG. 3 is a diagram illustrating an example of the internal configuration of an image light generation unit 4 illustrated in FIG. 2.

FIG. 3 is a diagram illustrating an example of the internal configuration of the image light generation unit 4 illustrated in FIG. 2.

The image light generation unit 4 includes a light source unit 40, a light modulation element 44, a driving unit 45 that drives the light modulation element 44, and a diffusion member 46.

The light source unit 40 includes a light source control unit 40A, an R light source 41r serving as a red light source that emits red light, a G light source 41g serving as a green light source that emits green light, a B light source 41b serving as a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43. The R light source 41r, the G light source 41g, and the B light source 41b constitute a light source of the HUD 10.

The dichroic prism 43 is an optical member for guiding rays of light emitted by the R light source 41r, the G light source 41g, and the B light source 41b to an identical light path. The dichroic prism 43 allows red light collimated by the collimator lens 42r to pass therethrough and emits the red light to the light modulation element 44. In addition, the dichroic prism 43 allows green light collimated by the collimator lens 42g to be reflected thereby and emits the green light to the light modulation element 44. Furthermore, the dichroic prism 43 allows blue light collimated by the collimator lens 42b to be reflected thereby and emits the blue light to the light modulation element 44. The optical member having such a function is not limited to the dichroic prism. For example, a cross dichroic mirror may be used.

A light emitting element, such as a laser or a light emitting diode (LED), is used as each of the R light source 41r, the G light source 41g, and the B light source 41b. The light source of the HUD 10 is not limited to the three light sources, that is, the R light source 41r, the G light source 41g, and the B light source 41b, and may be constituted by two light sources or four or more light sources each of which emits light in one of different wavelength ranges.

The light source control unit 40A controls each of the R light source 41r, the G light source 41g, and the B light source 41b, and performs control to cause light to be emitted by each of the R light source 41r, the G light source 41g, and the B light source 41b.

The light modulation element 44 spatially modulates, in accordance with image data received from the system control unit 6, the rays of light emitted by the R light source 41r, the G light source 41g, and the B light source 41b and emitted from the dichroic prism 43.

As the light modulation element 44, for example, liquid crystal on silicon (LCOS), a digital micromirror device (DMD), a micro electro mechanical systems (MEMS) element, a liquid crystal display element, or the like may be used.

The driving unit 45 drives the light modulation element 44 in accordance with image data received from the system control unit 6 and causes image light corresponding to the image data (red image light, blue image light, and green image light) to be emitted from the light modulation element 44 to the diffusion member 46.

The diffusion member 46 is a member that diffuses image light obtained through spatial modulation performed by the light modulation element 44, thereby making a plane light source. As the diffusion member 46, a micromirror array having a fine structure on its surface, a diffusion mirror, a reflection holographic diffuser, or the like is used.

The diffusion member 46 and the concave mirror 5 are optically designed so that an image based on image light projected onto the combiner 9 can be visually recognized by the driver as a virtual image at a position in front of the front windshield 2. The diffusion member 46 and the concave mirror 5 may be optically designed so that the image based on the image light can be visually recognized by the driver as a real image on the combiner 9.

The system control unit 6 of the HUD 10 controls the light source control unit 40A and the driving unit 45 and causes image light that is based on image data to be emitted from the image light generation unit 4 to the concave mirror 5.

The system control unit 6 drives the actuator of the rotation mechanism 11 in accordance with an operation signal received from an operation unit (not illustrated) and controls the rotation position of the combiner 9 to a designated value. In this way, in the projection display system 100, the combiner 9 is electrically rotated through an operation of the operation unit and the visibility of a virtual image or real image can be adjusted in accordance with the driver.

The system control unit 6 functions as an image light control unit that controls, in accordance with the projection angle of image light on the combiner 9 determined by the rotation position of the combiner 9, the intensity of light in the plurality of wavelength ranges (here, R light, G light, and B light) included in the image light.

The ROM of the system control unit 6 stores, in advance, control information for the intensity of image light corresponding to the projection angle of image light on the combiner 9. The system control unit 6 controls the intensity of the image light in accordance with the control information stored in the ROM.

Specifically, the control information is amount-of-light control information representing correction values, with respect to a reference amount of light, for the amount of light emitted by the R light source 41r, the amount of light emitted by the G light source 41g, and the amount of light emitted by the B light source 41b.

The correction values for the amount of light emitted by the R light source 41r, the amount of light emitted by the G light source 41g, and the amount of light emitted by the B light source 41b are factors that determine the intensity of each color of image light generated by the image light generation unit 4, and thus constitute the control information for the intensity of image light.

The wavelength selection film 7 has a characteristic that the reflectance for each of R light, G light, and B light is changed by the projection angle of image light. The control information is information for controlling the amount of light emitted by the light source of the HUD 10 so that the brightness of each of R light, G light, and B light viewed from the positions of the eyes of the driver is a target brightness regardless of any possible value of the projection angle of image light.

The control information is generated in the production line of the HUD 10 and is stored in the ROM of the system control unit 6.

Specifically, the arrangement of the HUD 10, the combiner 9, and the rotation mechanism 11 in an automobile is replicated in a factory. Furthermore, a light detection unit capable of detecting R light, G light, and B light is disposed in an eye box, which is a range in which both the eyes of the driver of the automobile to be equipped with the HUD 10 are assumed to be located. As the light detection unit, for example, an imaging device or the like capable of capturing a color image is used.

An operator connects the HUD 10 that has been produced, the rotation mechanism 11, and the above-described light detection unit to a computer in the production line and controls the rotation position of the combiner 9 to each of a plurality of values by using the computer.

The computer stores, in a storage medium, the brightness values of R light, G light, and B light detected by the light detection unit in a state where the rotation position of the combiner 9 is controlled to each of the plurality of values. The computer generates control information in accordance with the brightness values stored in the storage medium.

A description will be given of a specific example of a method for generating control information by using, as an example, the wavelength selection film 7 having a characteristic in which the relationship between the projection angle of image light and the brightness of each of R light, G light, and B light included in the image light reflected by the combiner 9 can be expressed by a quadratic function.

The relationship between a projection angle x of image light and a brightness $Y_R$ of R light reflected by the combiner 9 is expressed by the following expression (1). The relationship between the projection angle x of the image light and a brightness $Y_G$ of G light reflected by the combiner 9 is expressed by the following expression (2). The relationship between the projection angle x of the image light and a brightness $Y_B$ of B light reflected by the combiner 9 is expressed by the following expression (3).

$$Y_R = a_R(x-b_R)^2 + c_R \quad (1)$$

$$Y_G = a_G(x-b_G)^2 + c_G \quad (2)$$

$$Y_B = a_B(x-b_B)^2 + c_B \quad (3)$$

In expressions (1) to (3), each of $a_R$, $a_G$, $a_B$, $b_R$, $b_G$, $b_B$, $c_R$, $c_G$, and $c_B$ is a coefficient of a quadratic function.

The computer drives the rotation mechanism 11 to sequentially change the rotation position of the combiner 9 among, for example, five values, in a state where the amount of light emitted by each of the R light source 41r, the G light source 41g, and the B light source 41b of the HUD 10 is set to the reference amount of light. The computer stores, in the storage medium, the brightness values of R light, G light, and B light detected by the light detection unit in states where the combiner 9 is at the five rotation positions.

Subsequently, the computer calculates the coefficients $a_R$, $b_R$, and $c_R$ in expression (1) by using five brightness values of the R light obtained in the states where the combiner 9 is at the five rotation positions.

Similarly, the computer calculates the coefficients $a_G$, $b_G$, and $c_G$ in expression (2) by using five brightness values of the G light obtained in the states where the combiner 9 is at the five rotation positions.

Similarly, the computer calculates the coefficients $a_B$, $b_B$, and $c_B$ in expression (3) by using five brightness values of the B light obtained in the states where the combiner 9 is at the five rotation positions.

Subsequently, the computer obtains, through calculation of the following expression (4), a brightness correction value $\Delta\alpha_R$ of the R light necessary for achieving a predetermined target brightness $\alpha_R$ of the R light.

Similarly, the computer obtains, through calculation of the following expression (5), a brightness correction value $\Delta\alpha_G$ of the G light necessary for achieving a predetermined target brightness $\alpha_G$ of the G light.

Similarly, the computer calculates, through calculation of the following expression (6), a brightness correction value $\Delta\alpha_B$ of the B light necessary for achieving a predetermined target brightness $\alpha_B$ of the B light.

$$\Delta\alpha_R = \alpha_R - Y_R = \alpha_R - \{a_R(x-b_R)^2 + c_R\} \quad (4)$$

$$\Delta\alpha_G = \alpha_G - Y_G = \alpha_G - \{a_G(x-b_G)^2 + c_G\} \quad (5)$$

$$\Delta\alpha_B = \alpha_B - Y_B = \alpha_B - \{a_B(x-b_B)^2 + c_B\} \quad (6)$$

Finally, the computer stores, in the ROM of the system control unit 6 of the HUD 10, expressions (4) to (6) given above as control information.

The system control unit 6 detects the projection angle of image light in accordance with the rotation position of the combiner 9 and substitutes the detected projection angle for "x" in expressions (4) to (6), thereby generating the brightness correction value $\Delta\alpha_R$, the brightness correction value $\Delta\alpha_G$, and the brightness correction value $\Delta\alpha_B$. The relationship between the brightness correction value and the amount of emitted light is known, and data representing the relationship is stored in the ROM in advance.

The system control unit 6 controls the amount of light emitted by the R light source 41r to a target value that is obtained by adding the amount of emitted light corresponding to the brightness correction value $\Delta\alpha_R$ and the reference amount of light of the R light source 41r. In addition, the system control unit 6 controls the amount of light emitted by the G light source 41g to a target value that is obtained by adding the amount of emitted light corresponding to the brightness correction value $\Delta\alpha_G$ and the reference amount of light of the G light source 41g. In addition, the system control unit 6 controls the amount of light emitted by the B light source 41b to a target value that is obtained by adding the amount of emitted light corresponding to the brightness correction value $\Delta\alpha_B$ and the reference amount of light of the B light source 41b.

Accordingly, the brightness of each of the R light, the G light, and the B light observed by the driver of the automobile 1 is kept at a constant brightness even if the projection angle of image light is changed.

Note that expressions (1) to (3) given above can be obtained through calculation from the design information of the wavelength selection film 7. Thus, expressions (4) to (6) given above may be generated through calculation, not through actual measurement, in accordance with expressions (1) to (3) obtained from the design information of the wavelength selection film 7 and the target brightnesses $\alpha_R$, $\alpha_G$, and $\alpha_B$.

Here, the control information is generated as function expressions. Alternatively, a difference value between the brightness detected by the light detection unit and the target brightness may be calculated for each of possible projection angles of image light, and the difference value may be generated and stored as a brightness correction value.

Here, a brightness correction value for each projection angle is stored as control information. Alternatively, an absolute value of the amount of emitted light for each projection angle may be generated and stored as control information.

Figure 4:
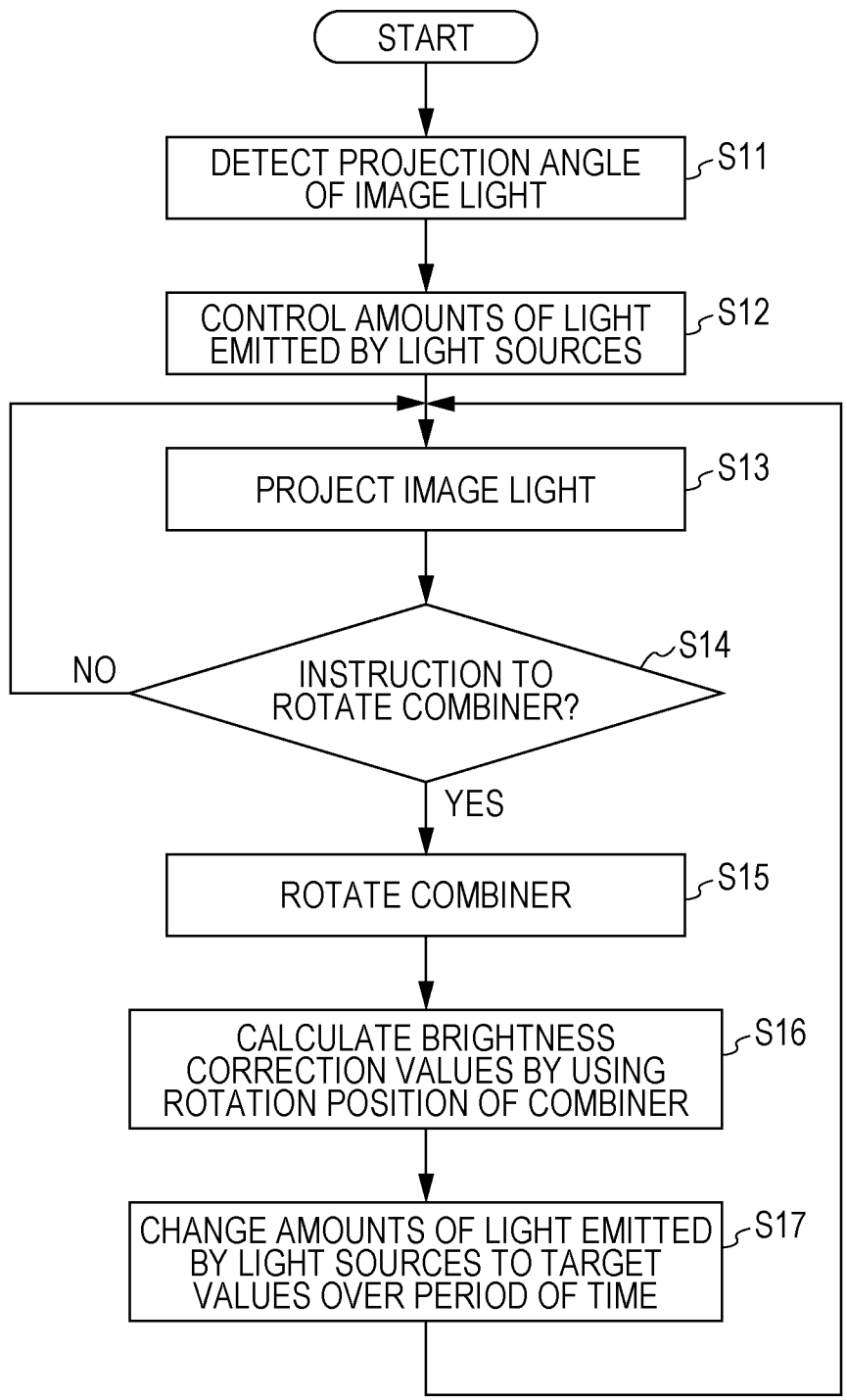
FIG. 4 is a flowchart for describing an operation of the projection display system 100 illustrated in FIG. 1.

FIG. 4 is a flowchart for describing an operation of the projection display system 100 illustrated in FIG. 1.

After the automobile 1 is activated through an operation of starting an engine of the automobile 1 (a motor in the case of an electric car), an operation of starting an electrical system (an air conditioner, lights, and so forth) driven by a battery of the automobile 1, or the like, the system control unit 6 detects the projection angle of image light in accordance with the rotation position of the combiner 9 (step S11).

Subsequently, the system control unit 6 obtains a brightness correction value $\Delta\alpha_R$, a brightness correction value $\Delta\alpha_G$, and a brightness correction value $\Delta\alpha_B$ by using the projection angle of the image light detected in step S11 and expressions (4) to (6) given above.

Subsequently, the system control unit 6 calculates target values of the amounts of light emitted by the R light source 41r, the G light source 41g, and the B light source 41b by using the brightness correction value $\Delta\alpha_R$, the brightness correction value $\Delta\alpha_G$, and the brightness correction value $\Delta\alpha_B$, and controls the amounts of light emitted by the R light source 41r, the G light source 41g, and the B light source 41b to the calculated target values (step S12).

Subsequently, when the system control unit 6 inputs image data to the driving unit 45, image light that is based on the image data is emitted from the image light generation unit 4 to the concave mirror 5, and the image light is reflected by the concave mirror 5 and projected onto the combiner 9 (step S13).

Upon the image light being projected, the system control unit 6 determines whether or not there is an instruction to change the rotation position of the combiner 9 (step S14). If there is the instruction (YES in step S14), the system control unit 6 rotates the combiner 9 in response to the instruction (step S15). If there is not the instruction (NO in step S14), the system control unit 6 causes the process to return to step S13.

After step S15, the system control unit 6 obtains a brightness correction value $\Delta\alpha_R$, a brightness correction value $\Delta\alpha_G$, and a brightness correction value $\Delta\alpha_B$ by using the current rotation position of the combiner 9 and expressions (4) to (6) given above (step S16).

Subsequently, the system control unit 6 calculates target values of the amounts of light emitted by the R light source 41r, the G light source 41g, and the B light source 41b by using the brightness correction value $\Delta\alpha_R$, the brightness correction value $\Delta\alpha_G$, and the brightness correction value $\Delta\alpha_B$ obtained in step S16 and the reference amount of light, and changes the amounts of light emitted by the R light source 41r, the G light source 41g, and the B light source 41b to the target values over a predetermined period of time (step S17).

Figure 5:
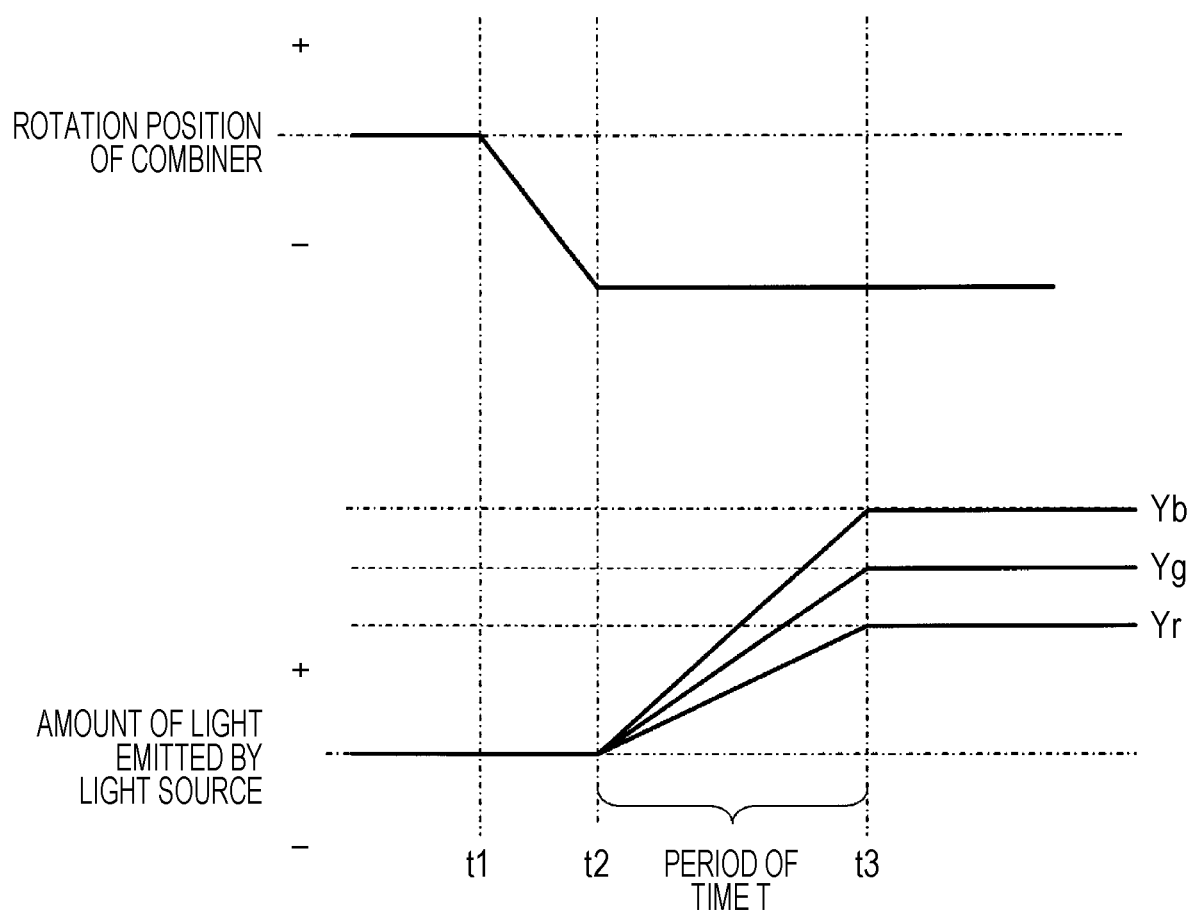
FIG. 5 is a timing chart for describing a specific example of step S17 illustrated in FIG. 4.

FIG. 5 is a timing chart for describing a specific example of step S17 illustrated in FIG. 4.

At time t1, an instruction to rotate the combiner 9 is provided and the system control unit 6 starts rotating the combiner 9. At time t2, the rotation is completed after the combiner 9 is rotated to a designated position.

The system control unit 6 detects the projection angle of image light in accordance with the rotation position of the combiner 9 at time t2 and obtains a brightness correction value $\Delta\alpha_R$, a brightness correction value $\Delta\alpha_G$, and a brightness correction value $\Delta\alpha_B$ by using the detected projection angle and expressions (4) to (6) given above. The system control unit 6 calculates target values of the amounts of light emitted by the individual light sources by using the obtained brightness correction values. In FIG. 5, the target values of the amounts of light emitted by the R light source 41r, the G light source 41g, and the B light source 41b are represented by Yr, Yg, and Yb.

The system control unit 6 changes the amounts of light emitted by the R light source 41r, the G light source 41g, and the B light source 41b continuously or stepwise so that the amounts of light emitted by the R light source 41r, the G light source 41g, and the B light source 41b reach the target values Yr, Yg, and Yb at time t3, which is the time after a predetermined period of time T elapses from time t2.

After step S17, the process returns to step S13.

As described above, according to the HUD 10, the amount of light emitted by each light source is controlled in accordance with the rotation position of the combiner 9. Thus, a virtual image or real image can be visually recognized at a constant brightness regardless of the rotation position of the combiner 9, and the visibility can be increased.

According to the HUD 10, the visibility can be increased without devising the characteristic of the wavelength selection film 7, and thus the cost for manufacturing the projection display system 100 can be reduced. In addition, since the characteristic of the wavelength selection film 7 is not limited, flexible designing is allowed, for example, the amount of rotation of the combiner 9 can be increased, and accordingly display quality can be increased.

According to the HUD 10, when the rotation position of the combiner 9 is changed and the projection angle of image light is changed, the amount of light emitted by each light source is changed continuously or stepwise over time from when the change in the projection angle is completed. In this way, the brightness of a virtual image or real image that is visually recognized is gradually changed to the target brightness, and accordingly display brightness can be naturally controlled with the driver being unaware of control of the brightness.

In the HUD 10, the control information stored in the ROM of the system control unit 6 is generated in accordance with the brightness of reflected light actually measured by using the HUD 10. Thus, the brightness of image light can be controlled in consideration of the individual variability of the HUD 10, and display quality can be increased.

The system control unit 6 may control the period of time T in FIG. 5 in accordance with the differences between the values of the amounts of light emitted by the individual light sources of the light source unit 40 at the time point immediately before the amounts of light emitted by the individual light sources are corrected and the target values Yb, Yg, and Yr.

Specifically, the system control unit 6 increases the period of time T as the differences between the amounts of light emitted by the individual light sources immediately before the rotation position of the combiner 9 is changed (the amounts of emitted light at time t2) and the target values Yb, Yg, and Yr of the amounts of light emitted by the individual light sources after the rotation position of the combiner 9 is changed increases.

Accordingly, if it is necessary to significantly change the brightness of image light, the brightness is changed over a long time. Thus, the brightness can be smoothly corrected and display quality can be increased. On the other hand, if it is not necessary to significantly change the brightness of image light, the change in the brightness is completed in a short time, and thus the time for brightness correction can be shortened.

The period of time T in FIG. 5 may be controlled independently for each light source of the light source unit 40. Alternatively, the period of time T may be determined in accordance with a maximum value of the differences between the amounts of light emitted by the individual light sources before the rotation position of the combiner 9 is changed and the target values of the amounts of light emitted by the individual light sources after the rotation position of the combiner 9 is changed, and the periods of time over which the amounts of light emitted by the three light sources are changed may be uniformalized by the period of time T.

The system control unit 6 may perform control to instantaneously (in a short period of time, such as a response delay of the system) switch the amounts of light emitted by the individual light sources to the target values in step S17 in FIG. 4. With this configuration, the period of time for controlling brightness can be shortened. As the period of time T, a period of time sufficiently longer than a response delay of the system is set.

Figure 6:
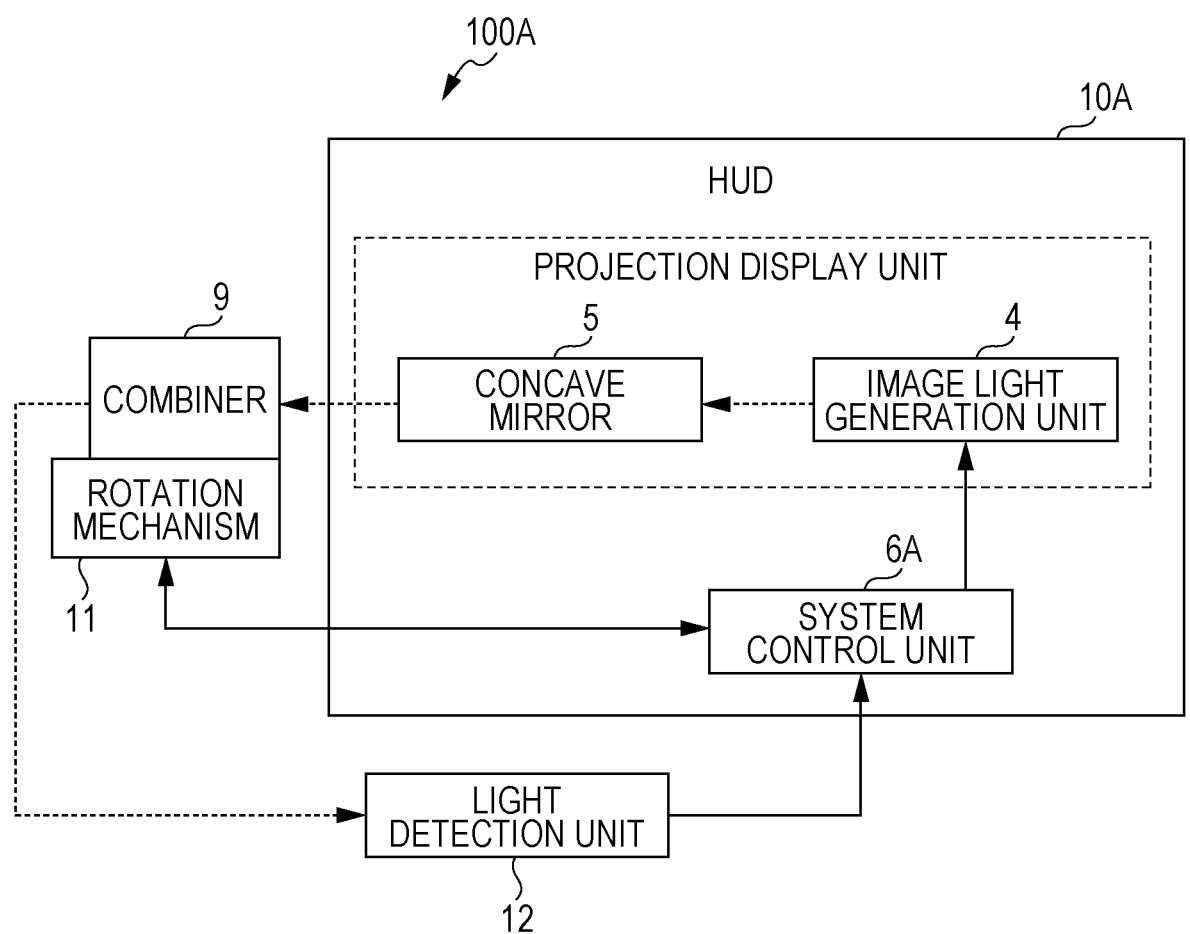
FIG. 6 is a schematic diagram illustrating the configuration of a projection display system 100A, which is a modification example of the projection display system 100 illustrated in FIG. 1.

FIG. 6 is a schematic diagram illustrating the configuration of a projection display system 100A, which is a modification example of the projection display system 100 illustrated in FIG. 1. The projection display system 100A has a configuration identical to that of the projection display system 100 except that the HUD 10 is replaced with a HUD 10A and that a light detection unit 12 is added. In FIG. 6, the elements identical to those in FIG. 2 are denoted by identical reference numerals and the description thereof will not be given.

The light detection unit 12 is installed inside the automobile 1 and detects image light that is projected from the HUD 10A and reflected by the combiner 9. As the light detection unit 12, for example, an imaging device or the like capable of capturing a color image is used.

The light detection unit 12 is installed near the eye box of the driver set in the projection display system 100A so as to be able to detect image light equivalent to image light observed by the driver.

The HUD 10A has a configuration identical to that of the HUD 10 except that the system control unit 6 is replaced with a system control unit 6A.

The system control unit 6A has, in addition to the function of the system control unit 6, a control information generation function of generating control information and storing it in the ROM. The system control unit 6A functions as a control information generation unit.

Figure 7:
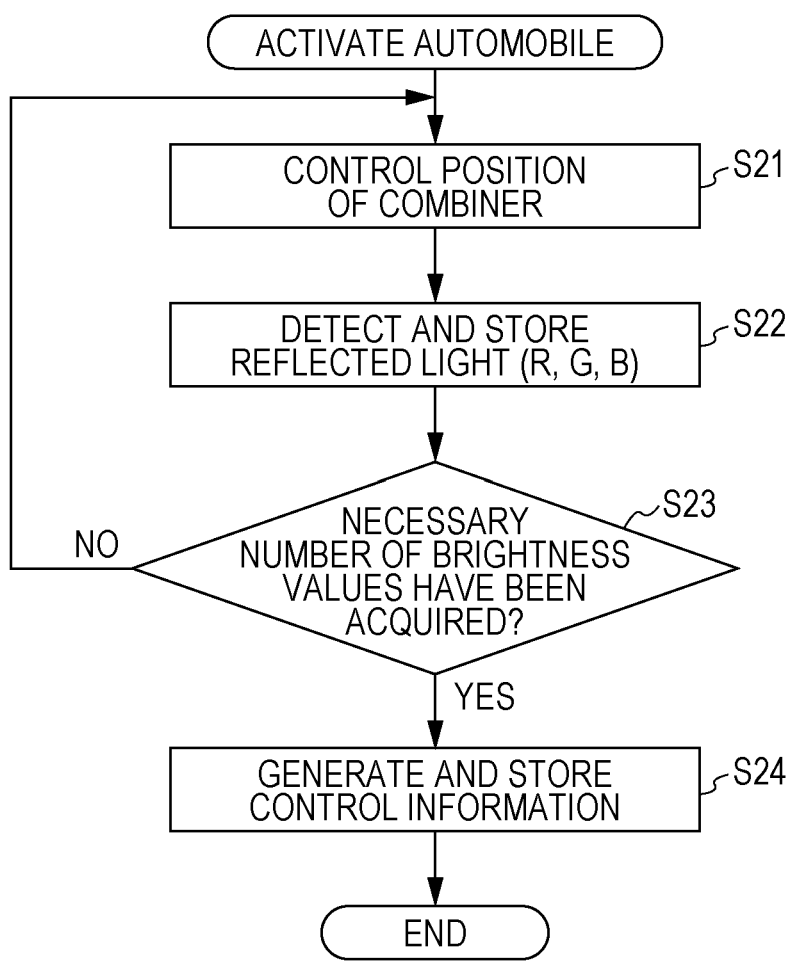
FIG. 7 is a flowchart for describing an operation in a calibration mode of the projection display system 100A.

The projection display system 100A has a calibration mode for generating control information and storing it in the ROM. FIG. 7 is a flowchart for describing an operation in the calibration mode of the projection display system 100A.

In the projection display system 100A, the calibration mode is set upon the automobile 1 being activated through an operation of starting the engine of the automobile 1 (a motor in the case of an electric car), an operation of starting the electrical system (an air conditioner, lights, and so forth) driven by the battery of the automobile 1, or the like, and then the process illustrated in FIG. 7 is started.

First, the system control unit 6A controls the rotation position of the combiner 9 to an arbitrary value (step S21). If image light is detected by the light detection unit 12 in this state, the system control unit 6A stores the brightness values of R light, G light, and B light in the detected image light in the RAM (step S22).

Subsequently, the system control unit 6A determines whether or not a necessary number of brightness values for generating control information have been acquired (step S23). Here, it is assumed that the process including steps S21 and S22 needs to be performed at least twice.

If a negative determination is made in step S23, the system control unit 6A causes the process to return to step S21. If an affirmative determination is made in step S23, the system control unit 6A generates control information in accordance with the brightness values stored in the RAM in the same manner as that used by the foregoing computer and stores the generated control information in the ROM (step S24).

Accordingly, the calibration mode ends, and then the process illustrated in FIG. 4 is started from step S11. The control information used in steps S12 and S16 in the process started here is different from that used in the projection display system 100 only in being generated in the calibration mode and stored in the ROM.

Here, the calibration is automatically set upon the automobile 1 being activated, but the calibration mode may be set at an arbitrary timing.

As described above, according to the projection display system 100A, the control information stored in the ROM can be updated at an arbitrary timing, such as a timing at which the automobile 1 is activated. Accordingly, the intensity of image light can be controlled in consideration of age-related deterioration of the individual elements of the projection display system 100A. Thus, even if the automobile 1 is used for a long period of time, degradation of display quality can be prevented.

Figure 8:
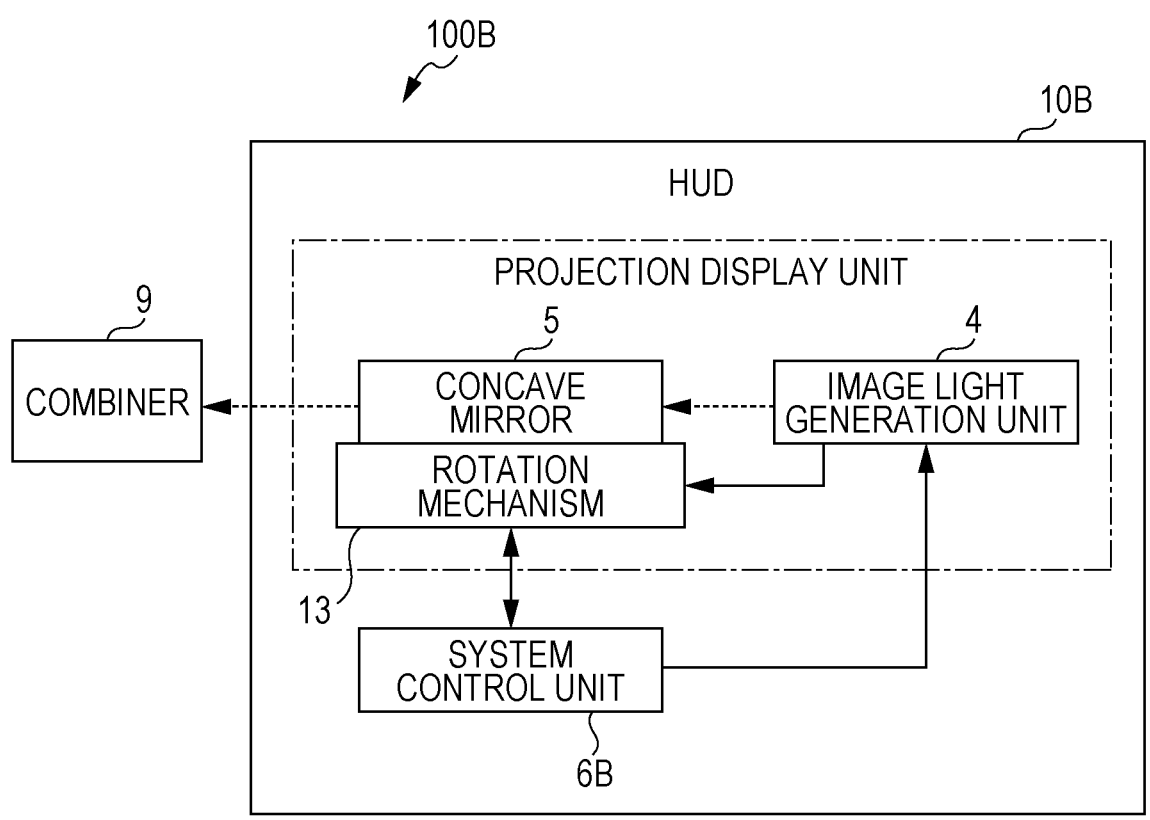
FIG. 8 is a schematic diagram illustrating the configuration of a projection display system 100B, which is a modification example of the projection display system 100 illustrated in FIG. 1.

FIG. 8 is a schematic diagram illustrating the configuration of a projection display system 100B, which is a modification example of the projection display system 100 illustrated in FIG. 1. The projection display system 100B has a configuration identical to that of the projection display system 100 except that the HUD 10 is replaced with a HUD 10B and that the rotation mechanism 11 is not provided. In FIG. 8, the elements identical to those in FIG. 2 are denoted by identical reference numerals and the description thereof will not be given.

The HUD 10B has a configuration identical to that of the HUD 10 illustrated in FIG. 2 except that a rotation mechanism 13 is added and that the system control unit 6 is replaced with a system control unit 6B. In the projection display system 100B, the combiner 9 including the transparent plate 8 and the wavelength selection film 7 is not rotatable.

The rotation mechanism 13 is a projection angle control mechanism for controlling the projection angle of image light projected from the HUD 10B onto the combiner 9.

Specifically, the rotation mechanism 13 is a mechanism for rotating the concave mirror 5 so that the projection position on the combiner 9 of image light projected from the concave mirror 5 is changed in a gravitational direction. The rotation mechanism 13 is equipped with an actuator (not illustrated) and is driven by the system control unit 6B.

When the rotation mechanism 13 rotates the concave mirror 5, the projection angle of image light projected from the concave mirror 5 onto the combiner 9 is changed.

The system control unit 6B detects the projection angle of image light in accordance with the rotation position of the concave mirror 5 and controls the amount of light emitted by each light source of the light source unit 40 in accordance with the detected projection angle and the above-described control information stored in the ROM.

In this way, with the concave mirror 5, not the combine 9, being rotated, control by the system control unit 6B enables constant display with constant brightness and improvement of display quality even in the configuration in which the projection angle of image light on the combiner 9 is changed.

Alternatively, the projection display system 100B may further have a rotation mechanism for rotating the combiner 9. In this case, the projection angle of image light on the combiner 9 is determined by a combination of the rotation position of the combiner 9 and the rotation position of the concave mirror 5. Thus, display quality can be increased by controlling the brightness of image light in accordance with the projection angle and the control information.

In the configuration of the projection display system 100B, the combiner 9 may be eliminated, the wavelength selection film 7 may be formed in the range of part of the front windshield 2, and image light may be projected by using the range as a projection surface.

In the configuration described above, the system control unit 6, 6A, or 6B controls the amount of light emitted by each light source of the light source unit 40, thereby keeping the intensity of image light constant. As a modification example of this configuration, the intensity of image light may be controlled to be constant by controlling the brightness of each of an R pixel, a G pixel, and a B pixel of image data input to the light modulation element 44 in accordance with the projection angle of the image light.

In this case, the ROM of the system control unit 6, 6A, or 6B may store, as brightness control information, information about an absolute value of the brightness of each of the R pixel, the G pixel, and the B pixel corresponding to the projection angle of image light or a correction value for a reference value of the brightness.

Alternatively, the intensity of image light may be controlled to be constant by controlling the lightness of each of the R pixel, the G pixel, and the B pixel of image data input to the light modulation element 44 in accordance with the projection angle of the image light.

In this case, the ROM of the system control unit 6, 6A, or 6B may store, as lightness control information, information about an absolute value of the lightness of each of the R pixel, the G pixel, and the B pixel corresponding to the projection angle of image light or a correction value for a reference value of the lightness.

Alternatively, the system control unit 6, 6A, or 6B may control the intensity of image light to be constant by controlling the amount of light emitted by each light source of the light source unit 40 and the lightness of each of the R pixel, the G pixel, and the B pixel of image data input to the light modulation element 44 in accordance with the projection angle of the image light.

In the projection display systems 100 and 100A, the rotation mechanism 11 electrically rotates the combiner 9. Alternatively, the rotation mechanism 11 may manually rotate the combiner 9.

In this case, a sensor (a photo reflector, a photo interrupter, a rotary encoder, or the like) for detecting the rotation position of the combiner 9 may be added to the projection display system 100 or 100A, and the system control unit 6 or 6A may detect the projection angle of image light in accordance with information from the sensor.

As described above, this specification discloses the followings.

A projection display device that is disclosed is a projection display device having a projection display unit that performs, in accordance with input image data, spatial modulation on light emitted by a light source, and projects image light obtained through the spatial modulation onto a projection surface of a vehicle to display an image that is based on the image data, the projection surface being formed of a member having a reflectance that is higher for light in a plurality of wavelength ranges than for light in a wavelength range outside the plurality of wavelength ranges. The projection display device includes a projection angle control mechanism that controls a projection angle of the image light on the projection surface; and an image light control unit that controls, in accordance with the projection angle, intensity of the light in the plurality of wavelength ranges included in the image light.

In the projection display device that is disclosed, the image light control unit controls the intensity of the light in the plurality of wavelength ranges included in the image light in accordance with control information for the intensity, the control information being stored in a storage medium and corresponding to the projection angle controlled by the projection angle control mechanism.

In the projection display device that is disclosed, the intensity is brightness, the projection display unit includes a plurality of light sources each of which emits light in respective one of the plurality of wavelength ranges, the control information stored in the storage medium is amount-of-light control information for an amount of light emitted by the light sources each of which emits light in respective one of the plurality of wavelength ranges, and the image light control unit controls the intensity by controlling the amount of light emitted by each of the plurality of light sources in accordance with the amount-of-light control information.

In the projection display device that is disclosed, the intensity is lightness and brightness, the projection display unit includes a plurality of light sources each of which emits light in respective one of the plurality of wavelength ranges, the control information stored in the storage medium includes amount-of-light control information for an amount of light emitted by the light sources each of which emits light in respective one of the plurality of wavelength ranges and lightness control information for lightness of each of colors in the plurality of wavelength ranges of the image data, and the image light control unit controls the intensity by controlling the amount of light emitted by each of the plurality of light sources in accordance with the amount-of-light control information and controlling the lightness of each of the colors in the plurality of wavelength ranges included in the image data in accordance with the lightness control information.

The projection display device that is disclosed further includes a light detection unit that detects light projected by the projection display unit and reflected by the projection surface; and a control information generation unit that generates the control information in accordance with the light in the plurality of wavelength ranges detected by the light detection unit in a state where the projection angle is controlled to each of a plurality of values by the projection angle control mechanism and that stores, in the storage medium, the generated control information.

In the projection display device that is disclosed, the control information generation unit generates the control information and stores the control information in the storage medium in synchronization with a timing at which the vehicle is activated.

In the projection display device that is disclosed, the control information generation unit calculates, in accordance with the intensity of the light in the plurality of wavelength ranges detected by the light detection unit in a state where the projection angle is controlled to each of the plurality of values, a function which represents a relationship between the projection angle and the intensity and in which the projection angle is a variable, and generates, as the control information, an arithmetic expression for subtracting the function from a target value of the intensity.

In the projection display device that is disclosed, the image light control unit causes the intensity of the light in the plurality of wavelength ranges included in the image light to reach a target value that is based on the projection angle after a predetermined period of time elapses from when a change in the projection angle is completed.

In the projection display device that is disclosed, the image light control unit controls the period of time in accordance with a difference between the target value and the intensity immediately before the projection angle is changed.

In the projection display device that is disclosed, the projection surface is formed of a member that has a visible light transmitting property and has a center wavelength of a reflection wavelength range in each of the plurality of wavelength ranges.

A projection control method that is disclosed is a projection control method for performing, in accordance with input image data, spatial modulation on light emitted by a light source, and projecting image light obtained through the spatial modulation onto a projection surface of a vehicle to display an image that is based on the image data, the projection surface being formed of a member having a reflectance that is higher for light in a plurality of wavelength ranges than for light in a wavelength range outside the plurality of wavelength ranges. The projection control method includes a projection angle control step of controlling a projection angle of the image light on the projection surface; and an image light control step of controlling, in accordance with the projection angle, intensity of the light in the plurality of wavelength ranges included in the image light.

In the projection control method that is disclosed, in the image light control step, the intensity of the light in the plurality of wavelength ranges included in the image light is controlled in accordance with control information for the intensity, the control information being stored in a storage medium and corresponding to the projection angle controlled in the projection angle control step.

In the projection control method that is disclosed, the intensity is brightness, the light source includes a plurality of light sources each of which emits light in respective one of the plurality of wavelength ranges, the control information stored in the storage medium is amount-of-light control information for an amount of light emitted by the light sources each of which emits light in respective one of the plurality of wavelength ranges, and in the image light control step, the intensity is controlled by controlling the amount of light emitted by each of the plurality of light sources in accordance with the amount-of-light control information.

In the projection control method that is disclosed, the intensity is lightness and brightness, the light source includes a plurality of light sources each of which emits light in respective one of the plurality of wavelength ranges, the control information stored in the storage medium includes amount-of-light control information for an amount of light emitted by the light sources each of which emits light in respective one of the plurality of wavelength ranges and lightness control information for lightness of each of colors in the plurality of wavelength ranges of the image data, and in the image light control step, the intensity is controlled by controlling the amount of light emitted by each of the plurality of light sources in accordance with the amount-of-light control information and controlling the lightness of each of the colors in the plurality of wavelength ranges included in the image data in accordance with the lightness control information.

The projection control method that is disclosed further includes a light detection step of detecting light reflected by the projection surface; and a control information generation step of generating the control information in accordance with the light in the plurality of wavelength ranges detected in the light detection step in a state where the projection angle is controlled to each of a plurality of values in the projection angle control step and storing, in the storage medium, the generated control information.

In the projection control method that is disclosed, in the control information generation step, the control information is generated and stored in the storage medium in synchronization with a timing at which the vehicle is activated.

In the projection control method that is disclosed, in the control information generation step, a function which represents a relationship between the projection angle and the intensity and in which the projection angle is a variable is calculated in accordance with the intensity of the light in the plurality of wavelength ranges detected in the light detection step in a state where the projection angle is controlled to each of the plurality of values, and an arithmetic expression for subtracting the function from a target value of the intensity is generated as the control information.

In the projection control method that is disclosed, in the image light control step, the intensity of the light in the plurality of wavelength ranges included in the image light is caused to reach a target value that is based on the projection angle after a predetermined period of time elapses from when a change in the projection angle is completed.

In the projection control method that is disclosed, in the image light control step, the period of time is controlled in accordance with a difference between the target value and the intensity immediately before the projection angle is changed.

In the projection control method that is disclosed, the projection surface is formed of a member that has a visible light transmitting property and has a center wavelength of a reflection wavelength range in each of the plurality of wavelength ranges.

A projection control program that is disclosed is a projection control program for performing, in accordance with input image data, spatial modulation on light emitted by a light source, and projecting image light obtained through the spatial modulation onto a projection surface of a vehicle to display an image that is based on the image data, the projection surface being formed of a member having a reflectance that is higher for light in a plurality of wavelength ranges than for light in a wavelength range outside the plurality of wavelength ranges. The projection control program causes a computer to execute a projection angle control step of controlling a projection angle of the image light on the projection surface; and an image light control step of controlling, in accordance with the projection angle, intensity of the light in the plurality of wavelength ranges included in the image light.

According to the present invention, a projection display device, a projection control method, and a projection control program that are able to make the visibility of an image favorable regardless of the incidence angle of light on a projection surface can be provided.

The present invention has been described above by using a specific embodiment. The present invention is not limited to the embodiment and can be variously changed without deviating from the technical spirit of the disclosed invention.

This application is based on Japanese Patent Application No. 2016-039036 filed on Mar. 1, 2016, which is incorporated herein in its entirety.

What is claimed is:

1. A projection display device having a projection display unit that performs, in accordance with input image data, spatial modulation on light emitted by a light source, and projects image light obtained through the spatial modulation onto a projection surface of a vehicle to display an image that is based on the image data,
the projection surface being formed of a member having a reflectance that is higher for light in a plurality of wavelength ranges than for light in a wavelength range outside the plurality of wavelength ranges,
the projection display device comprising:
a rotation angle control mechanism comprising an actuator that controls a rotation angle of the image light on the projection surface; and
a processor, being configured to function as
an image light control unit that controls, in accordance with the rotation angle, amount of intensity of the light in the plurality of wavelength ranges included in the image light,
wherein the image light control unit controls the amount of intensity of the light in the plurality of wavelength ranges included in the image light in accordance with control information for the amount of intensity, the control information being stored in a storage medium and corresponding to the rotation angle controlled by the rotation angle control mechanism,
wherein the image light control unit controls the amount of intensity by obtaining parameters related with relation between the rotation angle and the amount of intensity.

2. The projection display device according to claim 1, wherein
the amount of intensity is brightness,
the projection display unit comprises a plurality of light sources each of which emits light in respective one of the plurality of wavelength ranges,
the control information stored in the storage medium is amount-of-light control information for an amount of light emitted by the light sources each of which emits light in respective one of the plurality of wavelength ranges, and
the image light control unit controls the amount of intensity by controlling the amount of light emitted by each of the plurality of light sources in accordance with the amount-of-light control information.

3. The projection display device according to claim 2, wherein
the control information stored in the storage medium is RGB colors as wavelength ranges and adjusting the amount of intensity of light is actually about adjusting each of the RGB components.

4. The projection display device according to claim 1, wherein
the amount of intensity is lightness and brightness,
the projection display unit comprises a plurality of light sources each of which emits light in respective one of the plurality of wavelength ranges,
the control information stored in the storage medium comprises amount-of-light control information for an amount of light emitted by the light sources each of which emits light in respective one of the plurality of wavelength ranges and lightness control information for lightness of each of colors in the plurality of wavelength ranges of the image data, and
the image light control unit controls the amount of intensity by controlling the amount of light emitted by each of the plurality of light sources in accordance with the amount-of-light control information and controlling the lightness of each of the colors in the plurality of wavelength ranges included in the image data in accordance with the lightness control information.

5. The projection display device according to claim 4, wherein
the control information stored in the storage medium is RGB colors as wavelength ranges and adjusting the amount of intensity of light is actually about adjusting each of the RGB components.

6. The projection display device according to claim 1, further comprising:
an imaging device that detects light projected by the projection display unit and reflected by the projection surface; and
the processor, being configured to further function as
a control information generation unit that generates the control information in accordance with the light in the plurality of wavelength ranges detected by the light detection unit in a state where the rotation angle is controlled to each of a plurality of values by the rotation angle control mechanism and that stores, in the storage medium, the generated control information.

7. The projection display device according to claim 6, wherein
the control information generation unit generates the control information and stores the generated control information in the storage medium in synchronization with a timing at which the vehicle is activated.

8. The projection display device according to claim 6, wherein
the control information generation unit calculates, in accordance with the amount of intensity of the light in the plurality of wavelength ranges detected by the imaging device in a state where the rotation angle is controlled to each of the plurality of values, a function which represents a relationship between the rotation angle and the amount of intensity and in which the rotation angle is a variable, and generates, as the control information, an arithmetic expression for subtracting the function from a target value of the amount of intensity.

9. The projection display device according to claim 1, wherein
the projection surface is formed of a member that has a visible light transmitting property and has a center wavelength of a reflection wavelength range in each of the plurality of wavelength ranges.

10. A projection display device having a projection display unit that performs, in accordance with input image data, spatial modulation on light emitted by a light source, and projects image light obtained through the spatial modulation onto a projection surface of a vehicle to display an image that is based on the image data,
the projection surface being formed of a member having a reflectance that is higher for light in a plurality of wavelength ranges than for light in a wavelength range outside the plurality of wavelength ranges,
the projection display device comprising:
a rotation angle control mechanism comprising an actuator that controls a rotation angle of the image light on the projection surface; and
a processor, being configured to function as
an image light control unit that controls, in accordance with the rotation angle, amount of intensity of the light in the plurality of wavelength ranges included in the image light,
wherein the image light control unit causes the amount of intensity of the light in the plurality of wavelength ranges included in the image light to reach a target value that is based on the rotation angle after a predetermined period of time elapses from when a change in the rotation angle is completed.

11. The projection display device according to claim 10, wherein
the image light control unit controls the period of time in accordance with a difference between the target value and the amount of intensity immediately before the rotation angle is changed.

12. The projection display device according to claim 10, wherein
the projection surface is formed of a member that has a visible light transmitting property and has a center wavelength of a reflection wavelength range in each of the plurality of wavelength ranges.

13. A projection control method for performing, in accordance with input image data, spatial modulation on light emitted by a light source, and projecting image light obtained through the spatial modulation onto a projection surface of a vehicle to display an image that is based on the image data,
the projection surface being formed of a member having a reflectance that is higher for light in a plurality of wavelength ranges than for light in a wavelength range outside the plurality of wavelength ranges,
the projection control method configured to perform functions comprising:
controlling a rotation angle of the image light on the projection surface; and
controlling, in accordance with the rotation angle, amount of intensity of the light in the plurality of wavelength ranges included in the image light,
wherein the amount of intensity of the light in the plurality of wavelength ranges included in the image light is controlled in accordance with control information for the amount of intensity, the control information being stored in a storage medium and corresponding to the rotation angle,
wherein the image light control unit controls the amount of intensity by obtaining parameters related with relation between the rotation angle and the amount of intensity.

14. The projection control method according to claim 13, wherein
the amount of intensity is brightness,
the light source comprises a plurality of light sources each of which emits light in respective one of the plurality of wavelength ranges,
the control information stored in the storage medium is amount-of-light control information for an amount of light emitted by the light sources each of which emits light in respective one of the plurality of wavelength ranges, and
the amount of intensity is controlled by controlling the amount of light emitted by each of the plurality of light sources in accordance with the amount-of-light control information.

15. The projection control method according to claim 13, wherein
the amount of intensity is lightness and brightness,
the light source comprises a plurality of light sources each of which emits light in respective one of the plurality of wavelength ranges,
the control information stored in the storage medium comprises amount-of-light control information for an amount of light emitted by the light sources each of which emits light in respective one of the plurality of wavelength ranges and lightness control information for lightness of each of colors in the plurality of wavelength ranges of the image data, and
the amount of intensity is controlled by controlling the amount of light emitted by each of the plurality of light sources in accordance with the amount-of-light control information and controlling the lightness of each of the colors in the plurality of wavelength ranges included in the image data in accordance with the lightness control information.

16. The projection control method according to claim 13, further configured to perform functions comprising:
detecting light reflected by the projection surface; and
generating the control information in accordance with the light in the plurality of wavelength ranges in a state where the rotation angle is controlled to each of a plurality of values and storing, in the storage medium, the generated control information.

17. The projection control method according to claim 16, wherein
the control information is generated and stored in the storage medium in synchronization with a timing at which the vehicle is activated.

18. The projection control method according to claim 16, wherein
a function which represents a relationship between the rotation angle and the amount of intensity and in which the rotation angle is a variable is calculated in accordance with the amount of intensity of the light in the plurality of wavelength ranges in a state where the rotation angle is controlled to each of the plurality of values, and an arithmetic expression for subtracting the function from a target value of the amount of intensity is generated as the control information.

19. The projection control method according to claim 13, wherein
the projection surface is formed of a member that has a visible light transmitting property and has a center wavelength of a reflection wavelength range in each of the plurality of wavelength ranges.

20. A projection control method for performing, in accordance with input image data, spatial modulation on light emitted by a light source, and projecting image light obtained through the spatial modulation onto a projection surface of a vehicle to display an image that is based on the image data,
the projection surface being formed of a member having a reflectance that is higher for light in a plurality of wavelength ranges than for light in a wavelength range outside the plurality of wavelength ranges,
the projection control method configured to perform functions comprising:
controlling a rotation angle of the image light on the projection surface; and
controlling, in accordance with the rotation angle, amount of intensity of the light in the plurality of wavelength ranges included in the image light,
wherein the amount of intensity of the light in the plurality of wavelength ranges included in the image light is caused to reach a target value that is based on the rotation angle after a predetermined period of time elapses from when a change in the rotation angle is completed.

21. The projection control method according to claim 20, wherein
the period of time is controlled in accordance with a difference between the target value and the amount of intensity immediately before the rotation angle is changed.

22. The projection control method according to claim 20, wherein
the projection surface is formed of a member that has a visible light transmitting property and has a center wavelength of a reflection wavelength range in each of the plurality of wavelength ranges.

23. A non-transitory computer readable medium storing a computer readable instructions to be loaded into a processor configured by the instructions to perform functions comprising, in accordance with input image data, spatial modulation on light emitted by a light source, and projecting image light obtained through the spatial modulation onto a projection surface of a vehicle to display an image that is based on the image data,
the projection surface being formed of a member having a reflectance that is higher for light in a plurality of wavelength ranges than for light in a wavelength range outside the plurality of wavelength ranges,
the computer readable instructions causing a computer to execute functions comprising:
controlling a rotation angle of the image light on the projection surface; and
controlling, in accordance with the rotation angle, amount of intensity of the light in the plurality of wavelength ranges included in the image light,
wherein the amount of intensity of the light in the plurality of wavelength ranges included in the image light is controlled in accordance with control information for the amount of intensity, the control information being stored in a storage medium and corresponding to the rotation angle,
wherein the image light control unit controls the amount of intensity by obtaining parameters related with relation between the rotation angle and the amount of intensity.

24. A non-transitory computer readable medium storing a computer readable instructions to be loaded into a processor configured by the instructions to perform functions comprising, in accordance with input image data, spatial modulation on light emitted by a light source, and projecting image light obtained through the spatial modulation onto a projection surface of a vehicle to display an image that is based on the image data,
the projection surface being formed of a member having a reflectance that is higher for light in a plurality of wavelength ranges than for light in a wavelength range outside the plurality of wavelength ranges,
the computer readable instructions causing a computer to execute functions comprising:
controlling a rotation angle of the image light on the projection surface; and
controlling, in accordance with the rotation angle, amount of intensity of the light in the plurality of wavelength ranges included in the image light,
wherein the amount of intensity of the light in the plurality of wavelength ranges included in the image light is caused to reach a target value that is based on the rotation angle after a predetermined period of time elapses from when a change in the rotation angle is completed.

* * * * *